United States Patent [19]

Condon et al.

[11] 3,935,578

[45] Jan. 27, 1976

[54] THERMO-MAGNETIC IMAGE RECORDING METHODS AND APPARATUS

[75] Inventors: John F. Condon, Sunland; Frederick J. Jeffers, Altadena, both of Calif.; Sherman W. Duck, Highland Park, Ill.; Richard C. Bachand, Glendora, Calif.

[73] Assignee: Eastman Kodak Company, Rochester, N.Y.

[22] Filed: Feb. 25, 1974

[21] Appl. No.: 445,407

[52] U.S. Cl. .................... 346/74.1; 96/1 PE; 360/59

[51] Int. Cl. .................... G01d 15/10; G11b 5/02

[58] Field of Search ..... 360/59, 55; 346/74 R, 74.1; 96/1 E, 1 PE, 1 M

[56] References Cited

UNITED STATES PATENTS

| | | | |
|---|---|---|---|
| 3,312,979 | 4/1967 | Della Torre | 346/74 |
| 3,631,415 | 12/1971 | Aagard | 360/59 |
| 3,693,183 | 9/1972 | Lemke | 346/74.1 |
| 3,715,740 | 2/1973 | Schmit | 360/59 |
| 3,717,460 | 2/1973 | Duck | 96/1 E |

*Primary Examiner*—Bernard Konick
*Assistant Examiner*—Jay P. Lucas
*Attorney, Agent, or Firm*—M. S. Sales

[57] ABSTRACT

Magnetic image recording methods and apparatus employ a magnetic recording medium susceptible to an image-wise change of magnetization in response to thermal image patterns provided by image-wise exposures of a thermal image pattern generating device. The thermal device is subjected to repeated image-wise exposures, with each exposure including an exposure to an image part to which the thermal device is also exposed during another one of the exposures. The thermal device is moved relative to the recording medium between exposures, and the image is magnetically recorded onto the recording medium with the aid of thermal image patterns generated by the exposures.

In accordance with another aspect, the mentioned thermal device is exposed at different spatial locations to each elemental area of the image. The exposed spatial locations as to each elemental image are brought into coincidence relative to the recording medium, and the image is magnetically recorded onto the recording medium with the aid of thermal image patterns generated by the mentioned exposures.

11 Claims, 3 Drawing Figures

THERMO-MAGNETIC IMAGE RECORDING METHODS AND APPARATUS

BACKGROUND OF THE INVENTION

1. Field of the Invention

The subject invention relates to magnetic recording and, more particularly, to the magnetic recording of images with the assistance of thermal image patterns.

2. Description of the Prior Art

Magnetic imaging has been the subject of serious investigation in recent years, since it has several advantages over more conventional imaging techniques.

For instance, magnetic imaging offers the prospect of an avoidance of time-consuming and delicate chemical processing steps now required in customary photography. Magnetic imaging also offers the prospect of an avoidance of expensive and potentially dangerous high-voltage equipment now required in certain types of electrostatic xerography machines. Moreover, magnetic imaging techniques provide a record that is free of the decay encountered with electrostatic images and that can be printed out in large numbers without the need of reimaging between printouts.

Thanks to extensive efforts in this area, magnetic imaging techniques are becoming comparable in terms of light sensitivity and exposure speed with electrostatic xerography and with conventional photographic methods.

As a common denominator, these advanced magnetic imaging techniques employ a magnetic image recording medium susceptible to an image-wise change of magnetization in response to thermal image patterns. In some instances, the requisite thermal image pattern can be provided by a high-energy flash of light acting by way of a master image. Other situations, such as those wherein a high-intensity flash of light would damage the master image or would not be transmitted or reflected with sufficient intensity, require a thermal image pattern generating device which provides the requisite thermal image patterns in response to image-wise exposures.

An early attempt at such thermal image generating devices may be seen in U.S. Pat. Nos. 2,798,559 and 2,798,560 by A. J. Moncrieff-Yeates, issued July 9, 1957. That proposal overlooked the then still little known effect of thermoremanent magnetization and, accordingly, has found no commercial application in the better than 20 years of its existence. More recent developments have produced acceptable images, but are rather costly in their implementation. While this would still be satisfactory in the case of professional equipment or even in the case of heavily used commercial machines, there exists a need for low and medium priced magnetic copying, duplicating and other imaging methods and apparatus providing an image quality comparable to the potentially more expensive techniques.

In solving the underlying problem and in satisfying this need, the subject invention provides magnetic imaging methods and techniques which may also advantageously be employed in the context of high-grade professional and firstline commercial equipment.

A major drawback of even the most advanced prior-art magnetic imaging equipment resides in the fact that the image transducer they require, that is the device which provides thermal image patterns in response to image-wise exposures, approaches and, in some cases, even exceeds the capabilities of present-day technology in terms of energy requirements, resistance to thermal shock or deterioration, and fidelity and purity of reproduction. The effects of thermal transducer imperfections on the resulting magnetic image are particularly cumbersome and require considerable effort and expense for their elimination.

That prior-art efforts which have dealt with similar areas offer no solution may be seen from U.S. Pat. Nos. 2,914,403 by M. L. Sugarman, issued Nov. 24, 1959, 3,307,034, by L. F. Bean, issued Feb. 28, 1967, 3,424,579, by A. Balint et al, issued Jan. 28, 1969, 3,533,784, by D. B. Granzow et al, issued Oct. 13, 1970, 3,535,036, by G. K. Starkweather, issued Oct. 20, 1970, and 3,555,557, by G. R. Nacci, issued Jan. 12, 1971.

SUMMARY OF THE INVENTION

It is an object of the invention to overcome the above mentioned disadvantages and to satisfy the above mentioned needs.

It is a related object of the invention to provide improved magnetic image recording methods and techniques.

It is a more specific object of the invention to reduce the instantaneous power requirements of magnetic image recording methods and apparatus.

It is a further object of the invention to reduce adverse effects of thermal transducer imperfections in magnetic image recording methods and apparatus.

Further objects will appear from the following disclosure.

From one aspect thereof, the invention resides in a method of magnetically recording an image on a magnetic image recording medium susceptible to an image-wise change of magnetization in response to thermal image patterns provided by image-wise exposures of a thermal image pattern generating device. The invention according to this aspect resides, more specifically, in the improvement comprising in combination the steps of subjecting the thermal device to repeated image-wise exposures, with essentially each exposure including an exposure to an image part to which the thermal device is also exposed during another of the exposures, moving the thermal device relatively to the recording medium between exposures, and magnetically recording the image onto the recording medium with the aid of thermal image patterns generated by the exposures.

From another aspect thereof, the invention resides in a method of magnetically recording an image on a magnetic recording medium susceptible to an image-wise change of magnetization in response to thermal image patterns provided by image-wise exposures of a thermal image pattern generating device. The invention according to this aspect resides, more specifically, in the improvement comprising in combination the steps of exposing the thermal device at different spatial locations to essentially each elemental area of the image, bringing the spatial locations as to each elemental image area into coincidence relative to the recording medium, and magnetically recording the image onto the recording medium with the aid of thermal image patterns generated by the exposures.

From another aspect thereof, the invention resides in apparatus for magnetically recording an image on a magnetic recording medium susceptible to an image-wise change of magnetization in response to thermal image patterns. The invention according to this aspect resides in the improvement comprising, in combination, means for generating the thermal image patterns in response to image-wise exposures, means for subjecting the thermal image pattern generating means to repeated image-wise exposures, said subjecting means including means for moving the generating means relatively to the recording medium between exposures by such amounts as to include in essentially each exposure an exposure to an image part to which the generating means are also exposed during another of the exposures, and means operatively associated with the generating means for magnetically recording the image onto the recording medium with the aid of thermal image patterns generated by the generating means in response to the repeated exposures.

From another aspect thereof, the invention resides in apparatus for magnetically recording an image on a magnetic recording medium susceptible to an image-wise change of magnetization in response to thermal image patterns. The invention according to this aspect resides, more specifically, in the improvement comprising, in combination, means for generating the thermal image patterns in response to image-wise exposures, means for exposing the generating means to the image, including means for exposing the generating means at different locations to essentially each elemental area of the image, and means for bringing the spatial locations as to each elemental image area into coincidence relative to the recording medium, and means operatively associated with the generating means for magnetically recording the image onto the recording medium with the aid of thermal image patterns generated by the exposures.

BRIEF DESCRIPTION OF THE DRAWINGS

The invention will become more readily apparent from the following detailed description of preferred embodiments, illustrated by way of example in the accompanying drawings, in which.

DESCRIPTION OF PREFERRED EMBODIMENTS

Figure 1:
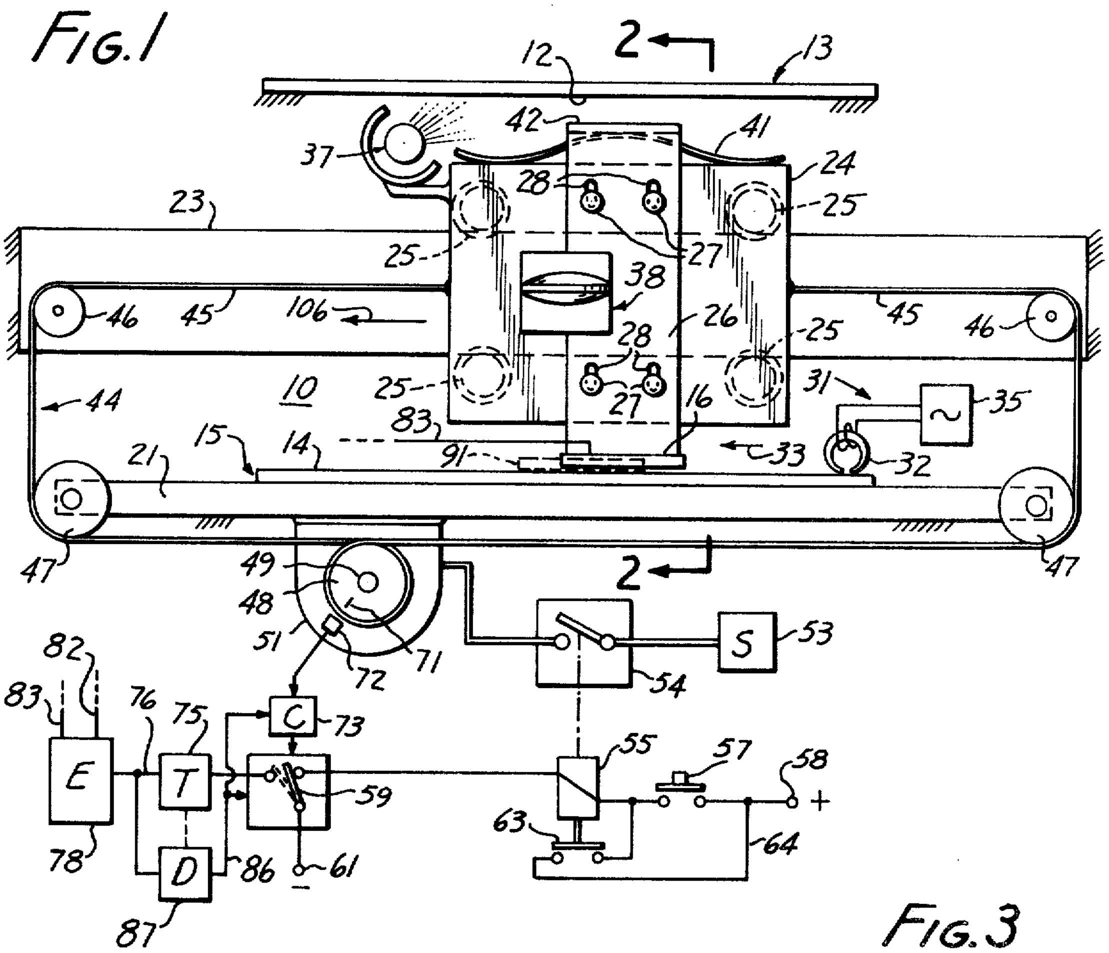
FIG. 1 is a side view of a magnetic image recording apparatus, together with a schematic of associated electrical circuitry, in accordance with a preferred embodiment of the invention.
Figure 2:
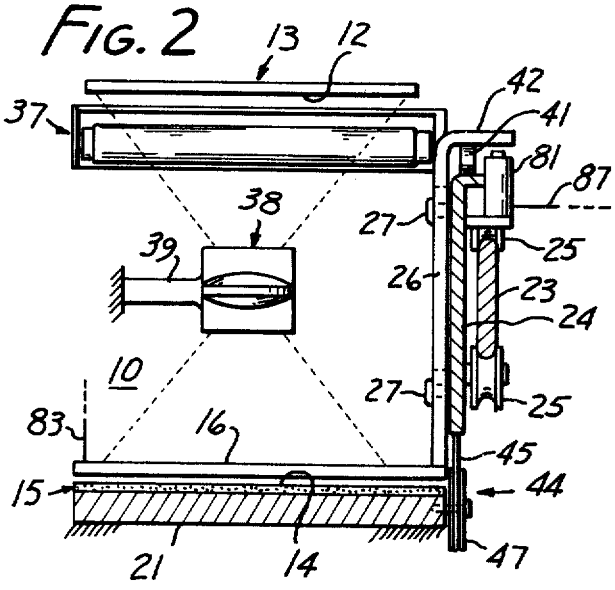
FIG. 2 is a section along the line 2 — 2 of FIG. 1.

The magnetic image recording apparatus 10 of FIGS. 1 and 2 has the object of recording an image 12 from a document or other master 13 onto the recording layer 14 of a magnetic image recording medium 15, with the aid of a thermal image transducer 16. When considering the illustrated apparatus, or this disclosure in general, as well as relevant aspects of magnetic image recording, its media and printout processes, it may be helpful to refer to the following U.S. Pat. Nos.

3,176,278, by L. J. Mayer, issued Mar. 30, 1965, 3,250,636, by R. A. Wilferth, issued May 10, 1966, 3,368,209, by McGlauchlin et al, issued Feb. 6, 1968, 3,364,496, by Greiner et al, issued Jan. 16, 1968, 3,526,598, by James U. Lemke, issued Sept. 1, 1970, 3,541,577, by James U. Lemke, issued Nov. 17, 1970, 3,582,877, by Luc P. Benoit, issued June 1, 1971, 3,592,977, by James U. Lemke, issued July 13, 1971, 3,601,091, by George G. Preckshot, issued Aug. 24, 1971, 3,611,420 and 3,611,421 by Luc P. Benoit, issued Oct. 5, 1971, 3,693,183, by James U. Lemke, issued Sept. 19, 1972, 3,707,001, by Norman Notley, issued Dec. 19, 1972, 3,717,459, by Richard J. McClure, issued Feb. 20, 1973, 3,717,460, by Duck et al, issued Feb. 20, 1973, and 3,781,903, by Jeffers et al, issued Dec. 25, 1973. Reference may also be had to British Patent Specification 1,275,663 by Bell & Howell Company.

In accordance with these and other relevant prior-art teachings, the magnetic image recording medium 15 is susceptible to an image-wise change of magnetization in response to thermal image patterns which are provided by image-wise exposures to the image 12 of the thermal image pattern generating device or thermal transducer 16.

By way of example, the recording medium 15 may include a low-Curie point magnetic recording medium located in the layer 14 and disposed on a suitable heat-resistant substrate as disclosed in several of the above mentioned patents.

The thermal transducer 16 may advantageously be of a photoconductor type wherein applied electric energy is controlled by photoconductor means exposed to the image to be recorded to provide a thermal pattern corresponding to the exposed image. Techniques for providing a particularly advantageous and effective optical image-to-thermal image transducer are disclosed in the above mentioned McClure and Duck et al U.S. Pat. Nos. 3,717,459 and 3,717,460.

The apparatus shown in FIGS. 1 and 2 has a table or platform 21 for supporting the magnetic recording medium 15 in any suitable manner.

A track or rail 23 is supported above the table 21 in parallel thereto. A carriage 24 rides along the rail 23 with the aid of four wheels 25 attached to the carriage proper.

A support 26 is connected to the carriage 24 by a set of mounting pins 27. The mounting pins 27 extend through elongate slots 28 in the support 26 and retain the support relative to the carriage by means of enlarged head portions. The configuration of the mounting pins 27 is thus similar to that of nails, and the elongate slots 28 permit limited up and down movement of the support 26 relative to the carriage 24.

The apparatus 10 includes equipment 31 for magnetizing the recording medium 14. Magnetizing equipment of this type is known as such, as are various appropriate magnetization techniques, most of which are disclosed in the above mentioned patents. By way of recapitulation, the recording medium is typically premagnetized and thereupon selectively demagnetized if image recording by selective demagnetization (e.g. by above-Curie point heating) is desired. On the other hand, the technique of thermoremanent magnetization requires that the magnetic recording medium be exposed to a magnetic field while selectively heated portions thereof cool back through a transition temperature (e.g. the Curie point). Refinements of these techniques are in many of the above mentioned patents.

In the illustrated preferred embodiment, the magnetization equipment 31 has a magnetic recording head 32 which extends along the width of the magnetic recording medium 15 and which is moved relatively to the magnetic recording medium in the direction of the arrow 33 by conventional means (not shown). The magnetic recording head 32 is typically energized from a source of alternating current 35 to provide in and at the magnetic recording layer 14 a grid pattern of magnetic gradients for improved image and printout quality.

If desired, the advanced techniques disclosed in the above mentioned Jeffers et al U.S. Pat. No. 3,781,903 may advantageously be employed in this connection. Also, magnetizing equipment of the type shown at 31 may be omitted from the apparatus 10, if previously premagnetized recording media are employed therein.

A lamp 37 is attached to the carriage 24 for illuminating the image 12 to be recorded and for providing in this manner a luminous image which is projected by a lens system 38 onto the thermal transducer 16. A relatively stationary arm 39 mounts the lens system 38 as seen in FIG. 2. The transducer 16 is mounted on a lower extremity of the support 26. In this connection it should be noted that the assembly including rail 23, carriage 24 and support 26 may be duplicated at the left-hand side as seen in FIG. 2, whereby the thermal transducer 16 can be mounted on both ends thereof. A showing of such duplication of parts has been avoided in the drawings to preserve a clear illustration.

A curved leaf spring 41 acts on a bracket 42 of the support 26 in order to bias the support 26 upwardly as seen in FIGS. 1 and 2, whereby to maintain the thermal transducer 16 normally spaced from the recording medium 15. This enables the carriage 24 to transport the thermal transducer 16 from place to place prior to, in the intervals between, and after the exposures. The carriage 24 itself is advanced by a wire drive 44 including a wire 45 having opposite ends attached to the carriage 24.

The wire extends over pulleys 46 rotatably mounted on the rail 23 and pulleys 47 rotatably mounted on the table 21, for instance. The wire 45 is wrapped around a capstan or drive pulley 48 attached to the output shaft 49 of an electric motor 51. The motor 51 is mounted on the platform 21 as shown in FIG. 1 and drives the carriage 24 along the rail 23 by action of the drive pulley 48 on the wire 45.

The motor 51 is energized from an electric power source 53 via a power switch 54 selectively actuated by a solenoid 55. To initiate energization of the motor 51, a push button 57 is temporarily closed. This energizes the solenoid 55 from one terminal 58 of an electric current source (not shown). The energization circuit proceeds from the terminal 58 through the then closed push button switch 57, the winding of solenoid 55, and a double-throw switch 59, to the opposite terminal 61 of the energizing electric current source. The double-throw switch 59 is biased to the position shown in FIG. 1, whereby the solenoid is energized upon temporary closure of the push button switch 57. In actuating the power switch 54, the solenoid 55 also closes a switch 63 which forms part of a self-holding circuit 64 circumventing the push button switch 57. Accordingly, the solenoid 55 remains energized in response to a temporary closure of the push button switch 57 as long as the switch 59 remains in the position illustrated in FIG. 1.

The motor 51 being energized upon closure of the power switch 54 by the solenoid 55, the drive pulley 48 will rotate to advance the carriage 24 and thus the thermal transducer 16 along the rail 23 relatively to the recording medium 15 by action on the wire or cable drive 44. Initially, this energization of the motor 51 will be utilized to drive the thermal transducer 16 from a rest position, such as a position beyond or at the right-hand margin of the recording medium 15 as seen in FIG. 1, to the first exposure position of the thermal transducer 16 relative to the recording layer 14. During the exposure process, energization of the motor 51 is employed to move the thermal transducer 16 from exposure position to exposure position in the repeated image-wise exposures according to the subject invention.

If desired, the self-holding switch 63 could be omitted, and the switch 59 could be replaced by a jumper wire (not shown) whereby the solenoid 55 would immediately be connected to the negative terminal 61. The manual switch 57 could then be closed for sufficient periods of time to effect the step-wise movement of the thermal transducer 16 in the intervals between the repeated image-wise exposures. In other words, the switch 59 may, if desired, be employed to effect an entirely manual control of the repeated exposure process.

In case an at least semi-automatic operation is desired, FIG. 1 discloses electronic circuitry, presently to be described for controlling the multi-exposure process in accordance with a preferred embodiment of the subject invention.

More specifically, a mark 71 is located on the drive pulley 48 to enable a pickup 72 to provide a counter 73 with an input signal indicative of the number of revolutions executed by the drive pulley 48. In accordance with conventional practice, the mark 71 may, for instance, be either magnetic or optically discernible, and the pickup 72 may be a magnetic or optical pickup. The counter may be of a conventional electronic type which, in accordance with standard practice, provides the switch 59 with an actuating signal in response to the execution of a predetermined number of revolutions by the drive pulley 48. The counter 73 is provided with a sufficient number of counting stages so that the switch 59 will be actuated when the pulley 48 has executed the number of revolutions which are necessary to move the thermal transducer 16 relative to the recording medium 15 by an amount requisite to the purposes of the subject invention as more fully described below.

The switch 59 may include a solenoid, not shown, similar to the solenoid 55 for actuating the switch from the solidly illustrated rest position to the active position indicated by a dotted line when the counter signal indicates that the thermal transducer 16 has been moved by the requisite amount in an interval between exposures.

Movement of the switch 59 to the active position causes a timer 75, which may be of a conventional type, to connect a line 76, for a time predetermined by the setting of the timer, and via the activated switch 59, to the terminal 61 of the energizing electric current source.

Energization of the line 76, in turn, causes activation of an electric power energizer 78. That power energizer may also be of a conventional type, including a solenoid (not shown) similar to the solenoid 55, and a power switch (not shown) similar to the power switch 54, for energizing a solenoid 81 shown in FIG. 2 and the thermal transducer 16 shown in FIGS. 1 and 2. In practice, the power switch in the energizer 78 just mentioned, may be connected to the electric power source 53 shown in FIG. 1 and, when actuated, may thus apply electric power to a line 82 leading to the solenoid 81, and to a line 83 leading to the thermal transducer 16.

Energization of the solenoid 81 via the line 82 results in attraction of the support bracket 42 against the bias of the spring 41. To this effect, the bracket 42 may be in the form of a magnetic armature. Of course, many prior-art designs are readily available to the skilled designer for effecting downward movement of the support 26 in response to energization of the line 82.

Downward movement of the support 26 brings the thermal transducer 16 into intimate heat-transfer relationship with the recording layer 14 of the magnetic recording medium 15 for and during each individual exposure.

Similarly, energization of the line 83 by the energizer 78 provides for the electric energization of the thermal transducer 16 for and during each exposure of the thermal transducer to at least part of the image 16 via the lens system 38. In this manner, the requisite thermal image pattern will be impressed upon the magnetic recording layer 14 for a magnetic recording of input image elements.

Upon completion of an individual exposure and image recording step, as determined by the timer setting, the timer 75 will automatically deenergize the line 76 and thus the energizer 78. This, in turn, will result in a deenergization of the solenoid 81 and of the thermal transducer 16. The spring 41 will, accordingly, return the support 26 to the position illustrated in FIGS. 1 and 2 whereby the thermal transducer 16 will again be spaced from the recording medium 15. In principle, the lamp 37 for illuminating the master image 12 may be continuously energized during the exposure process. On the other hand, a switch (not shown) may be provided for energizing the lamp only during the individual exposures. Such switch may either be incorporated into the energizer 78 or may be actuated in response to movement of the bracket 42 relative to the carriage 24.

Reverting now to the switch 59, it will be noted that such switch immediately interrupts the energization of the solenoid 55 when actuated from the solidly illustrated position to the active position shown by a dotted line. It will be recalled that this occurs when the drive pulley 48 has executed the requisite number of revolutions for an advancement of the thermal transducer to an exposure position. Deenergization of the solenoid 55 at that instance causes opening of the power switch 54 and thus deenergization of the motor 51, so that the thermal transducer 16 will remain stationary during each individual exposure step.

Upon completion of each exposure step, the switching device 59 and counter 73 are reset via a reset line 86 so as to clear these devices for the next transducer advancing operation. In FIG. 1, a delay device 87 is connected to the line 76 for an activation of the reset line 86 at the appropriate instant. The delay device may be of a conventional electronic design which provides a reset signal at the same time as the timer 75 deenergizes the line 76. Another well-known device that may be employed at 87 is a logic NOT element which provides a reset signal at 86 upon cessation of the energizing signal at 76. Moreover, if the switching device 59 and the counter 73 are of a type that are reset upon cessation of a signal, the reset line 86 may be connected directly to the previously mentioned line 76. Finally, since the operation of the devices 75 and 87 are typically complementary, the timer 75 itself may perform the resetting function for the devices 59 and 73 in any conventional manner.

In principle, the initiation of the transducer stepping process may be effected automatically. On the other hand, FIG. 1 shows a manual version for actuating the transducer transport after each exposure step. To this effect, the push button switch 57 is temporarily depressed, whereby the solenoid 55 and the motor 51 will be energized and temporarily maintained energized by operation of the self-holding switch 63. The drive pulley 48 will thereupon rotate and its rotations will be counted as described above until the transducer has been advanced to the next exposure position. The solenoid 81 and the thermal transducer 16 are thereupon again energized as described above so that the thermal transducer 16 is rendered effective at the next exposure position as indicated in dotted lines at 91 in FIG. 1.

In this manner, the thermal transducer 16 is moved along the magnetic recording medium 15 in overlapping steps relative to such recording medium. Individual image-wise exposures as described above are typically effected between each adjacent pair of steps.

In accordance with the principles of the subject invention, the lengths of the individual transducer transporting steps are such that each of the repeated image-wise exposure includes an exposure to a part of the image 12 to which the thermal device has also been exposed during another of the repeated exposures.

In practical terms, this may be implemented by advancing the thermal transducer 16 during each transducer transport step by an amount of movement smaller than the width of the transducer as seen in the direction of movement. If the transducer has more than one set of interdigitated electrodes, then the amount of movement during each step is preferably less than the width of any such electrode set.

In this manner, the thermal transducer 16 is exposed at least twice to each elemental area of the master image 12. In accordance with this aspect of the invention, these two or more exposures take place at different spatial locations on the thermal transducer 16 as to each multiply exposed image element. To provide for a faithful magnetic reporting of these multiply exposed image elements, the drive 45 moving the transducer 16 in effect brings the spatial locations of exposure as to each elemental area into coincidence relative to the recording medium. The master image 12 is thus recorded in a "step and exposure repeat" fashion.

In principle, the light source 37 or another lamp could be moved continuously whereby only the transducer 16 would be stepped. Moreover, if the light source 37 were of a pulsed type, and if the light pulses emitted thereby would be short relative to the time elapsed for the movement of the transducer 16 by an elemental amount comparable to the transducer resolution, then even the thermal transducer 16 could be moved in a continuous manner. The lens system 38 is typically of an inverting type and stationary. If a non-inverting lens system is used, it may be attached to the support 26 and moved with the transducer 16.

The recording medium 15 with the magnetically recorded image has utility of its own in that the magnetic image may be stored, sold or otherwise distributed, magnetically read or rendered visible in any known manner. Moreover, the magnetic image on the recording medium 15 may be magnetically duplicated on another recording medium by one of the well-known techniques including anhysteretic magnetization transfer or thermoremanent magnetic copying. Alternatively, the magnetic image may be magnetically printed out, such as by one of the printout techniques disclosed in many of the above mentioned patents.

Figure 3:
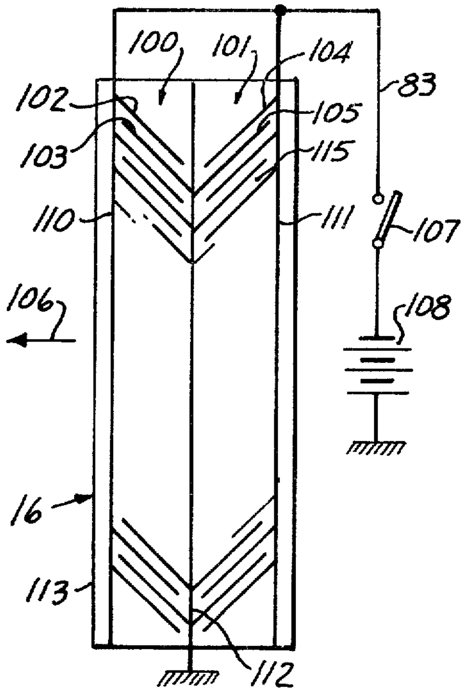
FIG. 3 is a top view, on an enlarged scale, of a thermal image transducer in accordance with a preferred embodiment of the subject invention and usable in the apparatus of FIGS. 1 and 2.

An electrode structure in accordance with a preferred embodiment of the subject invention, and suitable for use in the apparatus 10, is shown in FIG. 3.

According to FIG. 3, two sets 100 and 101 of interdigitated electrodes 102 and 103, and 104 and 105 are employed in the thermal transducer 16. For best results, the electrodes 102 to 105 are oriented at an angle relative to the direction of movement 106 of the thermal transducer 16 between individual exposures. In this manner, the repeated exposures according to the subject invention will best minimize the effects of electrode imperfections in the recorded magnetic image. For maximized results, the interdigitated electrodes among the sets 100 and 101 are arranged in a chevron pattern whereby undesired raster or moire effects are automatically compensated in successive exposure steps.

A switch 107, which may be included in the energizer 78 of FIG. 1 applies electric power from a source 108 via bus bars 110 and 111 to the electrodes 102 and 104. A bus bar 112 returns the electrode currents to the source 108 via ground.

The interdigitated electrodes may be provided on a suitable transparent support as disclosed in the above mentioned McClure and Duck et al U.S. Pat. Nos. 3,717,459 and 3,717,460. In addition, a photoconductive material 115 of the type disclosed in the latter or in other ones of the above mentioned patents may be disposed in electric contact with the electrodes 102 to 105, such as in the form of a photoconductor layer, for controlling the electric energy supplied to and flowing between the interdigitated electrodes in response to the above mentioned image-wise exposures. In this manner, the thermal transducer provides the requisite thermal patterns that correspond to the exposed input image.

It is a feature of the subject invention that the length of the individual transducer transporting steps need not be minutely accurate. Accordingly, it is possible to delete much of the electronic circuitry shown in FIG. 1, and to control the stepping function of the thermal transducer 16 merely by a timer without a counting of the drive pulley revolutions being then necessary.

In addition to the advantages already specifically pointed out, the subject invention permits the use of a transducer 16 that is considerably smaller in area than the recording layer 14 of the medium 15. In this manner, the instantaneous power requirements on the energizing electric source are considerably reduced in comparison to prior-art versions wherein the thermal transducer was comparable in size to the magnetic recording medium. The resulting reduced electric currents are more easily handled by the thermal transducer 16 and particularly by its bus bars 110, 111 and 112 and electrode sets 100 and 101.

On the other hand, where the size of the thermal transducer poses no particular problems, the transducer 16 may be dimensioned to be essentially of the same size as the recording layer 14 of the medium 15. In that case, the entire recording layer 14 would be exposed to a thermal image which, as generated by the larger-size transducer, would represent the whole input image 12. In accordance with the principles of the subject invention, the large-size transducer would repeatedly be exposed to the same input image 12 and would be somewhat moved in position between the, or each, adjacent pair of exposures. In this manner, effects of imperfections in the thermal transducer would be compensated or obliterated, since — due to the transducer movements of the subject invention — no imperfection would be located twice at the same spot relative to the recording medium.

The subject extensive disclosure will suggest or render apparent various modifications and variations within the spirit and scope of the subject invention to those skilled in the art.

We claim:

1. A method of recording an image of a given dimension on a magnetic medium susceptible to a local change in magnetization in response to being heated to a predetermined temperature, said method including the steps of:

placing an actuatable thermal image pattern generating device in heat transmitting proximity to at least a portion of said magnetic medium;

actuating said generating device to record on said magnetic medium a local change in magnetization according to a predetermined image pattern;

moving said generating device relative to said magnetic medium to a second position in heat transmitting proximity to said magnetic medium;

reactuating said generating device; and repeating said moving and reactuating steps until each elemental area of said magnetic medium within said given dimension of the image to be recorded thereon has been exposed to the heat from at least two different elemental areas of said generating device.

2. The method as defined in claim 1 wherein said generating device has a given dimension along its direction of movement and wherein each moving step is no greater than onehalf the length of said given dimension of said generating device.

3. A method of recording an image of a given dimension on a magnetic medium susceptible to a local change in magnetization in response to being heated to a predetermined temperature, said method including the steps of:

optically projecting said image onto said medium;

placing a light-to-heat transducer in at least a portion of said projected image and in heat transmitting proximity to a corresponding portion of said medium; and moving said transducer relative to said projected image and said medium to at least a second position in heat transmitting proximity to said medium until every portion of said projected image has impinged upon at least two different elemental areas of said transducer.

4. Apparatus for magnetically recording an image of a given area on a magnetic medium susceptible to a local change in magnetization in response to being heated to a predetermined temperature, said apparatus comprising:

a thermal image pattern generating device having a predetermined surface area; and a mount for said device, said mount being movable between at least two distinct positions whereat said device is in heat transmitting proximity to at least a portion of said magnetic medium, the number of such positions being such that each elemental area of said magnetic medium within said image area is exposed to the heat from at least two distinct elemental areas of the surface area of said device.

5. Apparatus as defined in claim 4 wherein said generating device includes:

a set of interdigitated electrodes; and means for applying electrical energy to said electrodes.

6. Apparatus as defined in claim 4 wherein said generating device includes photoconductor means for generating said thermal image pattern in response to being exposed to an optical image of such pattern.

7. Apparatus as defined in claim 4 wherein said generating device includes:

photoconducor means for generating said thermal image pattern in response to being exposed to an optical image of such pattern; and interdigitated electrode means for supplying said photoconductor means with an electrical energy.

8. Apparatus for recording an image of a given dimension on a magnetic medium susceptible to a local change in magnetization in response to being heated to a predetermined temperature, said apparatus includes:

means for optically projecting said image onto said medium;

a light-to-heat transducer having a predetermined surface area; and a mount for said transducer, said mount being movable between at least two distinct positions whereat said transducer is in heat transmitting proximity to at least a portion of said projected image, the number of such positions being such that every portion of said projected image has impinged upon at least two different elemental areas of said transducer.

9. Apparatus as defined in claim 8 wherein said transducer includes:

a set of interdigitated electrodes; and means for applying electrical energy to said electrodes.

10. Apparatus as defined in claim 8 wherein said transducer includes:

a set of interdigitated electrodes arranged in a chevron pattern; and means for applying electrical energy to said electrodes.

11. Apparatus for magnetically recording an image of a given area on a magnetic medium susceptible to a local change in magnetization in response to being heated to a predetermined temperature, said apparatus comprising:

a thermal image pattern generating device having (1) a predetermined surface area, (2) a set of interdigitated electrodes arranged in a chevron pattern and (3) means for applying electrical energy to said electrodes; and a mount for said device, said mount being movable between at least two distinct positions whereat said device is in heat transmitting proximity to at least a portion of said magnetic medium, the number of such positions being such that each elemental area of said magnetic medium within said image area is exposed to the heat from at least two distinct elemental areas of the surface area of said device.

* * * * *